US009787595B2

(12) United States Patent
Yiu et al.

(10) Patent No.: US 9,787,595 B2
(45) Date of Patent: Oct. 10, 2017

(54) EVOLVED NODE-B AND MOBILITY MANAGEMENT ENTITY AND USER EQUIPMENT AND METHODS FOR SUPPORTING ATTENDED AND UNATTENDED SERVICES

(71) Applicant: Intel IP Corporation, Santa Clara, CA (US)

(72) Inventors: Candy Yiu, Portland, OR (US); Ana Lucia Pinheiro, Hillsboro, OR (US); Marta Martinez Tarradell, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 76 days.

(21) Appl. No.: 14/532,751

(22) Filed: Nov. 4, 2014

(65) Prior Publication Data

US 2015/0271087 A1    Sep. 24, 2015

Related U.S. Application Data

(60) Provisional application No. 61/969,782, filed on Mar. 24, 2014.

(51) Int. Cl.
*H04L 12/801* (2013.01)
*H04W 76/02* (2009.01)

(52) U.S. Cl.
CPC .............. *H04L 47/35* (2013.01); *H04L 47/14* (2013.01); *H04W 76/022* (2013.01)

(58) Field of Classification Search
CPC ............. H04W 28/0289; H04W 76/02; H04W 28/0268; H04W 72/1242; H04W 8/20; H04L 47/14; H04L 47/11; H04L 47/20
See application file for complete search history.

(56) References Cited

U.S. PATENT DOCUMENTS

2009/0252132 A1    10/2009  Song et al.
2010/0103863 A1     4/2010  Ulupinar et al.
(Continued)

FOREIGN PATENT DOCUMENTS

KR   102013010344      9/2013
WO   WO-2009134178 A1  11/2009
WO   WO-2015148157 A1  10/2015

OTHER PUBLICATIONS

International Application Serial No. PCTUS2015020431, International Search Report mailed Jun. 18, 2015, 4 pgs.
(Continued)

*Primary Examiner* — David Oveissi

(74) *Attorney, Agent, or Firm* — Schwegman Lundberg & Woessner, P.A.

(57) ABSTRACT

Embodiments of an Evolved Node-B (eNB) to support packet-switched (PS) services according to EPS bearers are disclosed herein. The eNB may receive an EPS bearer setup message from an MME for an establishment of an EPS bearer for a PS service between a User Equipment (UE) and a PGW. The EPS bearer setup message may include an attention indicator for the PS service that indicates whether traffic for the PS service is attended or unattended at the UE. The eNB may further transmit traffic packets to and receive traffic packets from the UE 102 as part of the PS service. In addition, the eNB may use the attention indicator as part of congestion control in the network.

28 Claims, 7 Drawing Sheets

(56) References Cited

U.S. PATENT DOCUMENTS

| | | | | |
|---|---|---|---|---|
| 2011/0032834 A1* | 2/2011 | Kim | ............... | H04W 72/087 |
| | | | | 370/252 |
| 2012/0008554 A1* | 1/2012 | Kim | ............... | H04W 76/022 |
| | | | | 370/328 |
| 2013/0148621 A1 | 6/2013 | Laitila et al. | | |
| 2015/0358483 A1* | 12/2015 | Jeong | ............ | H04W 28/0289 |
| | | | | 370/328 |
| 2015/0365929 A1* | 12/2015 | Gu | ..................... | H04W 8/20 |
| | | | | 455/450 |

OTHER PUBLICATIONS

International Application Serial No. PCTUS2015020431, Written Opinion mailed Jun. 18, 2015, 7 pgs.

"Korean Application Serial No. 10-2016-7021911, Office Action dated Jun. 14, 2017", 7 pgs.

"Korean Application Serial No. 10-2016-7021911, Response Filed Aug. 14, 2017 to Office Action dated Jun. 14, 2017", (W/ English Claims), 32 pgs.

"UPCON Solution for Performance Differentiation keeping bearer level QoS", SA WG2 Meeting #98, S2-132669, (Jul. 9, 2013), 7 pgs.

Ericsson, et al., "Enhancements to Operator Control of Ran Congestion Handling Solution", SA WG2 Meeting S2 #98, S2-132408, (Jul. 9, 2013), 4 pgs.

Huawei, et al., "On User plane congestion mitigation in E-UTRAN", 3GPP TSG RAN meeting#60, RP-130684, (2013), 3 pgs.

\* cited by examiner

| QCI | RESOURCE TYPE | PRIORITY | PACKET DELAY BUDGET | PACKET ERROR LOSS RATE | ATTENTION | EXAMPLE SERVICES |
|---|---|---|---|---|---|---|
| 1 | GBR | 2 | 100 msec | 1.00E-02 | ATTENDED | CONVERSATIONAL VOICE |
| 2 | | 4 | 150 msec | 1.00E-03 | ATTENDED | CONVERSATIONAL VIDEO (LIVE STREAMING) |
| 3 | | 3 | 50 msec | 1.00E-03 | ATTENDED | REAL-TIME GAMING |
| 4 | | 5 | 300 msec | 1.00E-06 | UNATTENDED | NON-CONVERSATIONAL VIDEO (BUFFERED STREAMING) |
| 5 | NON-GBR | 1 | 100 msec | 1.00E-06 | UNATTENDED | IMS SIGNALING |
| 6 | | 6 | 300 msec | 1.00E-06 | UNATTENDED | VIDEO (BUFFERED STREAMING), TCP-BASED (WWW, E-MAIL, CHAT, FTP, P2P SHARING, PROGRESSIVE VIDEO, ETC.) |
| 7 | | 7 | 100 msec | 1.00E-03 | ATTENDED | VOICE, VIDEO (LIVE STREAMING), INTERACTIVE GAMING |
| 8 | | 8 | 300 msec | 1.00E-06 | UNATTENDED | VIDEO (BUFFERED STREAMING), TCP-BASED (WWW, E-MAIL, CHAT, FTP, P2P SHARING, PROGRESSIVE VIDEO, ETC.) |
| 9 | | 9 | | | | |

FIG. 6

| QCI | RESOURCE TYPE | PRIORITY | PACKET DELAY BUDGET | PACKET ERROR LOSS RATE | ATTENTION | EXAMPLE SERVICES |
|---|---|---|---|---|---|---|
| 1 | GBR | 2 | 100 msec | 1.00E-02 | ATTENDED | CONVERSATIONAL VOICE |
| 1' | | | | | UNATTENDED | |
| 2 | | 4 | 150 msec | 1.00E-03 | ATTENDED | CONVERSATIONAL VIDEO (LIVE STREAMING) |
| 2' | | | | | UNATTENDED | |
| 3 | | 3 | 50 msec | 1.00E-03 | ATTENDED | REAL-TIME GAMING |
| 3' | | | | | UNATTENDED | |
| 4 | | 5 | 300 msec | 1.00E-06 | ATTENDED | NON-CONVERSATIONAL VIDEO (BUFFERED STREAMING) |
| 4' | | | | | UNATTENDED | |
| 5 | NON-GBR | 1 | 100 msec | 1.00E-06 | ATTENDED | IMS SIGNALING |
| 5' | | | | | UNATTENDED | |
| 6 | | 6 | 300 msec | 1.00E-06 | ATTENDED | VIDEO (BUFFERED STREAMING), TCP-BASED (WWW, E-MAIL, CHAT, FTP, P2P SHARING, PROGRESSIVE VIDEO, ETC.) |
| 6' | | | | | UNATTENDED | |
| 7 | | 7 | 100 msec | 1.00E-03 | ATTENDED | VOICE, VIDEO (LIVE STREAMING), INTERACTIVE GAMING |
| 7' | | | | | UNATTENDED | |
| 8 | | 8 | 300 msec | 1.00E-06 | ATTENDED | VIDEO (BUFFERED STREAMING), TCP-BASED (WWW, E-MAIL, CHAT, FTP, P2P SHARING, PROGRESSIVE VIDEO, ETC.) |
| 8' | | | | | UNATTENDED | |
| 9 | | 9 | | | ATTENDED | |
| 9' | | | | | UNATTENDED | |

FIG. 7

| QCI | RESOURCE TYPE | PRIORITY | PACKET DELAY BUDGET | PACKET ERROR LOSS RATE | ATTENTION | EXAMPLE SERVICES |
|---|---|---|---|---|---|---|
| 1 | GBR | 2 | 100 msec | 1.00E-02 | ATTENDED | CONVERSATIONAL VOICE |
| 2 | | 4 | 150 msec | 1.00E-03 | ATTENDED | CONVERSATIONAL VIDEO (LIVE STREAMING) |
| 3 | | 3 | 50 msec | 1.00E-03 | ATTENDED | REAL-TIME GAMING |
| 4 | | 5 | 300 msec | 1.00E-06 | ATTENDED | NON-CONVERSATIONAL VIDEO (BUFFERED STREAMING) |
| 4' | | | | | UNATTENDED | |
| 5 | NON-GBR | 1 | 100 msec | 1.00E-06 | ATTENDED | IMS SIGNALING |
| 5' | | | | | UNATTENDED | |
| 6 | | 6 | 300 msec | 1.00E-06 | ATTENDED | VIDEO (BUFFERED STREAMING), TCP-BASED (WWW, E-MAIL, CHAT, FTP, P2P SHARING, PROGRESSIVE VIDEO, ETC.) |
| 6' | | | | | UNATTENDED | |
| 7 | | 7 | 100 msec | 1.00E-03 | ATTENDED | VOICE, VIDEO (LIVE STREAMING), INTERACTIVE GAMING |
| 8 | | 8 | 300 msec | 1.00E-06 | ATTENDED | VIDEO (BUFFERED STREAMING), TCP-BASED (WWW, E-MAIL, CHAT, FTP, P2P SHARING, PROGRESSIVE VIDEO, ETC.) |
| 8' | | | | | UNATTENDED | |
| 9 | | 9 | | | ATTENDED | |
| 9' | | | | | UNATTENDED | |

FIG. 8

EVOLVED NODE-B AND MOBILITY MANAGEMENT ENTITY AND USER EQUIPMENT AND METHODS FOR SUPPORTING ATTENDED AND UNATTENDED SERVICES

PRIORITY CLAIM

This application claims priority under 35 USC 119(e) to U.S. Provisional Patent Application Ser. No. 61/969,782, filed Mar. 24, 2014, which is incorporated herein by reference in its entirety.

TECHNICAL FIELD

Embodiments pertain to wireless communications. Some embodiments relate to cellular communication networks including LTE networks. Some embodiments relate to Quality of Service architecture. Some embodiments relate to congestion control. Some embodiments relate to attended services and unattended services.

BACKGROUND

A wireless network and mobile devices operating in the network may utilize or support various voice and data services that may be quite different in nature. For instance, a voice application may use a relatively low amount of system throughput, but may also need a relatively low latency and may be considered a high priority service to a user of the device. In contrast, a data application that does not need to run in real time may be considered a low priority service and may tolerate a higher latency than voice. Due to the different nature of some of the services, a Quality of Service (QoS) architecture that takes such factors into account in prioritizing traffic and allocating resources may benefit overall network performance.

In some cases, the network may become congested, even with a QoS architecture in place. As an example, the throughput supported by a wireless link between a base station and mobile devices may be insufficient during certain time periods. As another example, a network component may be unable to meet latency demands for routing and forwarding of traffic during peak demand periods, especially when supporting several components. Such congestion may have a negative impact on the network and user experience, and therefore there is a general need for methods and techniques for reduction of network congestion.

BRIEF DESCRIPTION OF THE DRAWINGS

FIG. 6 illustrates examples of Quality of Service Class Indicators (QCI) for various voice and data services in accordance with some embodiments;

FIG. 7 illustrates additional examples of Quality of Service Class Indicators (QCI) for various voice and data services in accordance with some embodiments;

FIG. 8 illustrates additional examples of Quality of Service Class Indicators (QCI) for various voice and data services in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
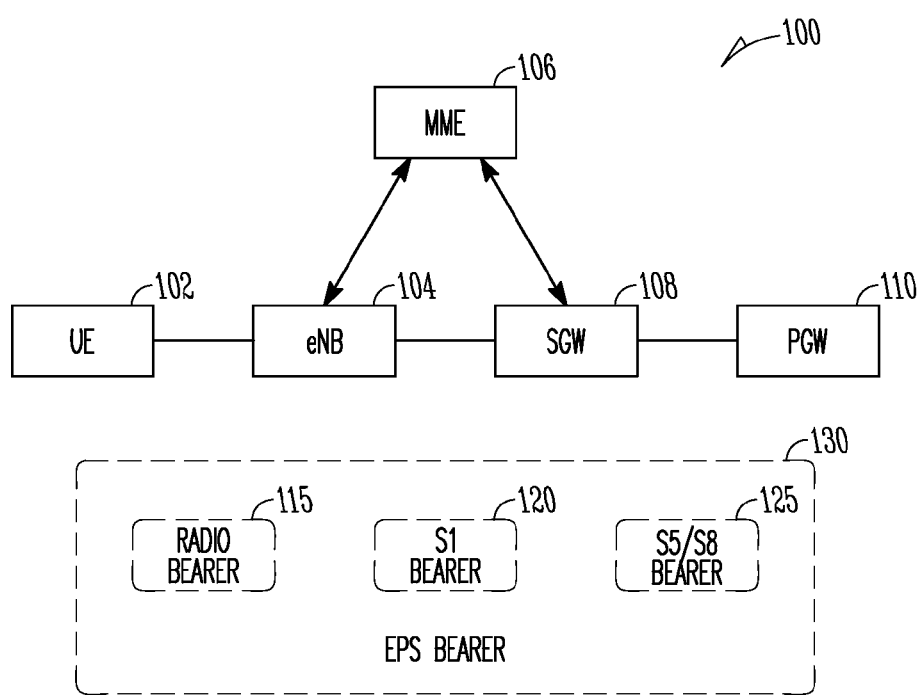
FIG. 1 is a functional diagram of a 3GPP network in accordance with some embodiments.

FIG. 1 shows a portion of an end-to-end network architecture of an LTE network with various components of the network in accordance with some embodiments. The network 100 may include one or more Evolved Node-Bs (eNBs) 104, which may operate as base stations, and may support one or more User Equipments (UEs) 102 or mobile devices. The network 100 may also include a Mobility Management Entity (MME) 106, which may manage mobility aspects in access such as gateway selection and tracking area list management. The network 100 may also include a Serving Gateway (SGW) 108, which may be a local mobility anchor point for inter-eNB handovers and also may provide an anchor for inter-3GPP mobility. Other responsibilities of the SGW 108 may include lawful intercept, charging, and some policy enforcement. The network 100 may further include a Packet Data Network Gateway (PGW) 110, which may route data packets between the network 100 and external networks, and may be a key node for policy enforcement and charging data collection. The PGW 110 may also provide an anchor point for mobility with non-LTE accesses. In some embodiments, the SGW 108 and the MME 106 may be implemented in one physical node or separate physical nodes. In some embodiments, the PGW 110 and SGW 108 may be implemented in one physical node or separated physical nodes.

For packet-switched (PS) services, an Evolved Packet System (EPS) bearer 130 may be established for communication between the PGW 110 and the UE 102. The EPS bearer 130 may be associated with a Quality of Service (QoS) for the PS service, which may enable prioritization or de-prioritization of resources (such as throughput) for the PS service. The EPS bearer 130 may include a radio bearer 115 for exchanging of packets between the eNB 104 and UE 102, an S1 bearer 120 for exchanging of packets between the eNB 104 and the SGW 108, and an S5/S8 bearer 125 for exchanging of packets between the SGW 108 and the PGW 110.

In some embodiments, the eNB 104 may fulfill various logical functions for the network 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

In accordance with some embodiments, the eNB 104 may receive an EPS bearer setup message from the MME 106 for an establishment of an EPS bearer 130 for a PS service between a UE 102 and a PGW 110. The EPS bearer setup message may include an attention indicator for the PS service that indicates whether traffic for the PS service is attended or unattended at the UE 102. The eNB 104 may further transmit traffic packets to and receive traffic packets from the UE 102 as part of the PS service. The eNB 104 may also transmit traffic packets to and receive traffic packets from the PGW 110 as part of the PS service. These embodiments are described in more detail below.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
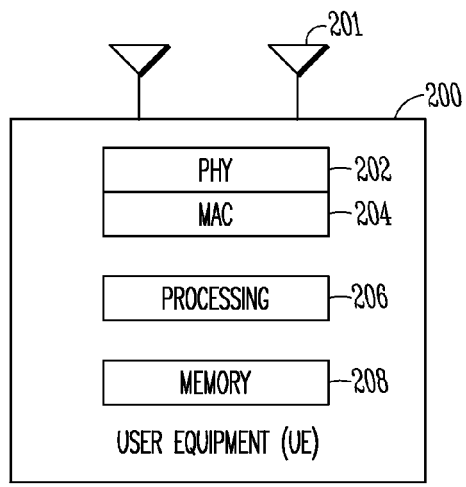
FIG. 2 is a functional diagram of a User Equipment (UE) in accordance with some embodiments.
Figure 3:
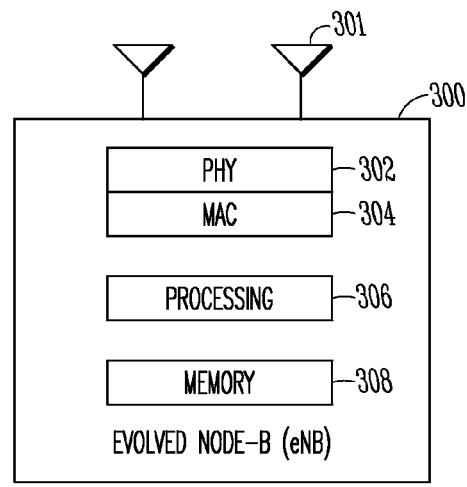
FIG. 3 is a functional diagram of an Evolved Node-B (eNB) in accordance with some embodiments.
Figure 4:
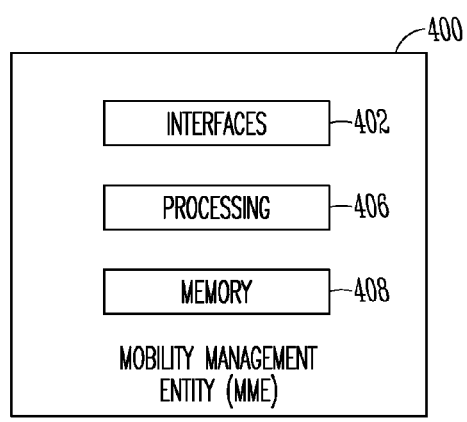
FIG. 4 is a functional diagram of a Mobility Management Entity (MME) in accordance with some embodiments.

FIG. 2 shows a block diagram of a UE 200 in accordance with some embodiments. FIG. 3 shows a block diagram of an eNB 300 in accordance with some embodiments. FIG. 4 shows a block diagram of a Mobility Management Entity (MME) 400 in accordance with some embodiments. It should be noted that in some embodiments, the eNB 300 may be a stationary non-mobile device. The UE 200 may be a UE 102 as depicted in FIG. 1, the eNB 300 may be an eNB 104 as depicted in FIG. 1, and the MME 400 may be an MME 106 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein. The eNB 300 may also include processing circuitry 306 and memory 308 arranged to perform the operations described herein. The MME 400 may also include processing circuitry 406 and memory 408 arranged to perform the operations described herein. In addition, the MME 400 may include one or more interfaces 402 that may enable wireless or wired communication with other components such as the eNB 300 or others.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

In some embodiments, the mobile device or other device can be the UE 200 or eNB 300 configured to operate in accordance with 3GPP standards. Accordingly, the eNB 300 may be configured to receive an EPS bearer setup message from the MME 106 for an establishment of an EPS bearer 130 for a PS service between the UE 200 and the PGW 110. The EPS bearer setup message may include an attention indicator for the PS service that indicates whether traffic for the PS service is attended or unattended at the UE 200. The eNB 300 may further transmit traffic packets to and receive traffic packets from the UE 200 as part of the PS service and may use the attention indicator as part of congestion control in the network. These embodiments will be described in more detail below. In some embodiments, the mobile device or other device may be configured to operate according to other protocols or standards, including IEEE 802.11 or other IEEE standards.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the eNB 104 may support packet-switched (PS) services in a network in accordance with Evolved Packet System (EPS) bearers. The eNB 104 may include hardware processing circuitry to receive, from an MME, an EPS bearer setup message for an establishment of an EPS bearer for a PS service between the UE 102 and the PGW 110. The EPS bearer setup message may include an attention indicator for the PS service that indicates whether traffic for the PS service is attended or unattended at the UE 102. The hardware processing circuitry may be further configured to transmit, according to the EPS bearer, a traffic packet to the UE 102 as part of the PS service. These embodiments are described in more detail below.

In some scenarios, a user of an application at the UE 102 may not be interacting with or paying attention to the application. Traffic for the application during such time periods may be unattended traffic, and therefore may be considered less important than traffic for an application with which the user is actively engaged. In addition, the unattended traffic at the UE 102 may also be less important than attended traffic from an application at a different mobile device, at least from the overall network and system perspective.

Figure 5:
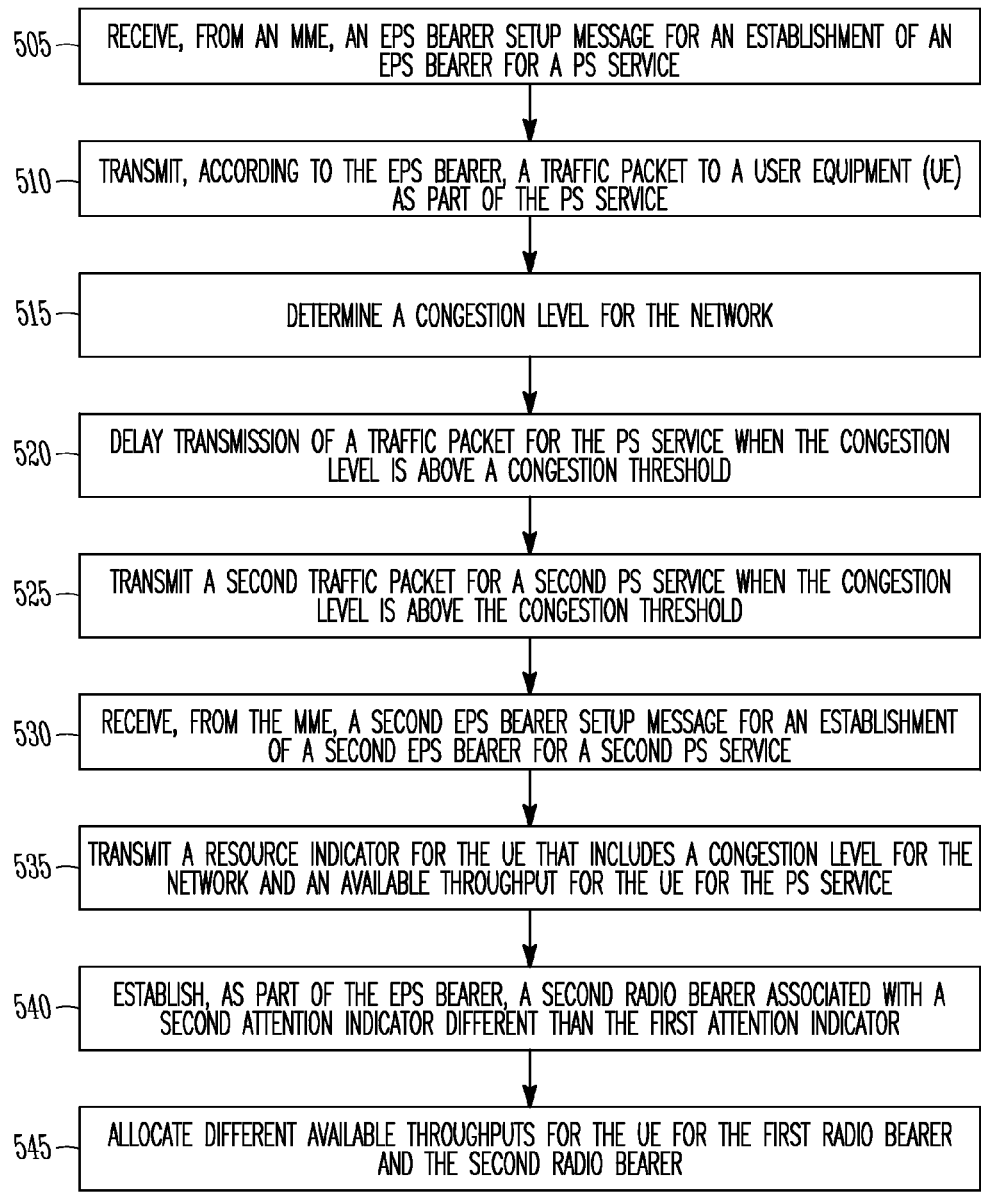
FIG. 5 illustrates the operation of a method of supporting packet-switched (PS) services in accordance with some embodiments.

Referring to FIG. 5, a method 500 of supporting packet-switched (PS) services in accordance with an EPS bearer 130 is shown. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-11, although it is understood that the method 500 may be practiced with any other suitable systems, interfaces and components.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

At operation 505 of the method 500, an EPS bearer setup message for an establishment of an EPS bearer 130 for a PS service between the UE 102 and a Packet Data Network Gateway (PGW) 110 may be received at the eNB 104. In some embodiments, the EPS bearer setup message may be received at the eNB 104 from the Mobility Management Entity (MME) 106. That is, the EPS bearer setup message may be transmitted by the MME 106 to the eNB 104 for the establishment of the EPS bearer 130 for the PS service between the UE 102 and the PGW 110. Such embodiments are not limiting, however, as similar or other EPS bearer setup messages may also be received at the eNB 104 from other components. The EPS bearer setup message may include an attention indicator for the PS service that indicates whether traffic for the PS service is attended or unattended at the UE 102.

It should be noted that the EPS bearer setup message may be any suitable message related to the establishment of the EPS bearer 130. As an example, the MME 106 may manage the process of setting up the EPS bearer 130, and may send EPS bearer setup message and other messages to the eNB 104 as part of the process. The EPS bearer setup message received at the eNB 104 may be an "initial context setup request" message or similar, but is not limited as such. The EPS bearer setup message may be a message included in 3GPP or other standards or specifications, but is also not limited as such. In addition, the management of the establishment process of the EPS bearer 130 is not limited to the MME 106.

In some embodiments, the PS service may be associated with an application operating at the UE 102, and when the traffic for the PS service is attended, the traffic may be at least partly generated by or used by the application during a time period of user interaction with the application at the UE 102. That is, attended traffic for the application may be associated with user interaction or human interaction with the application. In addition, when the traffic for the PS service is unattended, the traffic may be at least partly generated by or used by the application during a time period in which there is a lack of interaction with the application at the UE 102. That is, unattended traffic for the application may be associated with a lack of user interaction or human interaction with the application. It should be noted that classification of the traffic as attended/unattended may be temporary in some cases, and may change as a result of user behavior, user input at the UE 102 (like a mouse click on a window associated with the application). In addition, some applications may be associated with both attended and unattended traffic.

As an example, voice traffic may be considered attended traffic as it may enable a user of the UE 102 to have a phone conversation. As another example, a user may initiate a downloading of a file in the background at the UE 102 without paying attention to or interacting with the download process. The traffic downloaded in this example may be considered or classified as unattended traffic. In the same example, the user may actively watch a window at the UE 102 that gives the progress of the download or the user may check the progress of the download, in which case the traffic may be considered or classified as attended traffic.

It should be noted that the attention indicator is not limited to taking on the values of attended/unattended, and may also take on values such as yes/no or similar. In addition, the attention indicator is not limited to a binary value, and may also include other related information, which may require more than just the single binary indicator. In some embodiments, the attention indicator may enable the network or components of the network, such as the eNB 104, to differentiate between attended and unattended traffic for purposes such as scheduling, prioritization, congestion control, optimizations or other operations related to network operation or performance.

In some embodiments, the attention indicator for the PS service may be included in contextual information stored or used at various components or at the UE 102. For instance, the EPS bearer context may include an attention indicator for each EPS bearer 130, in addition to other configuration information related to the EPS bearer 130 such as an EPS bearer ID, Transaction Identifier, Tunnel Endpoint Identifiers, P-GW IP address, QCI, and Traffic Flow Template (TFT). Accordingly, the attention indicator included in the EPS bearer context or other context may be included outside of the QCI or may be excluded from the QCI in some embodiments. These embodiments are not limiting, however, as the attention indicator may be included within the QCI in some embodiments, as will be described below. Inclusion of the attention indicator within the QCI may be in addition to, or instead of, inclusion in the EPS bearer context or other context.

In some embodiments, the EPS bearer setup message may include a Quality of Service class indicator (QCI) for the PS service that is associated with a QCI priority, QCI performance thresholds, and the attention indicator for the PS service. It should be noted that the QCI and examples of QCI described herein may be included as part of 3GPP or other standards, but are not so limited, and may be defined or specified apart from these standards.

Referring to FIGS. 6-8, several example QCIs are presented in the QCI tables 600, 700, 800. It should be noted that the tables 600, 700, 800 and other QCI tables or data structures may be utilized in operations and techniques described herein, but the operations and techniques are not limited to the use or storage of the information in the table form presented. In addition, the number of QCIs and the number of parameters associated with each QCI are not limited by the number shown in FIGS. 6-8, and values shown in FIGS. 6-8 for the parameters are non-limiting examples shown for illustrative purposes.

In FIG. 6, each of the nine rows of the table 600 is associated with a QCI 610 (labeled 1-9 accordingly) and other parameters or information related to, associated with or included in the QCI 610. For each QCI 610, example services 640 are listed for illustrative purposes, but are not limiting, as other services not listed may also utilize one of the QCIs 610. The resource type 615 may take on values of guaranteed bit-rate (GBR) or non-GBR. The priority 620 for the QCI 610 may be a ranking within the table 600 or other classification. As an example, a scheduling algorithm may choose to send a traffic packet associated with a QCI of high priority before a traffic packet associated with a QCI of lower priority.

The packet delay budget 625 and packet error loss rate 630 for the QCI 610 may be QCI performance thresholds that describe operating conditions that should be met in order to maintain a satisfactory user experience. For instance, QCI #3 in the table 600 has the lowest packet delay budget 625 (e.g., 50 msec) in the table 600, which may apply to applications like real-time gaming in which user experience may suffer if the delay is above 50 msec. The attention indicator 635 for each QCI 610 may take on the value of attended/unattended as previously described regarding user interaction (or lack of) with an application at the UE 102. It should be noted that the values for the attention indicator 635 shown in the table 600 are examples only, and other tables or implementations may provide different values for the attention indicator 635.

In FIG. 7, 18 rows of the table 700 are each associated with a QCI 710, and each QCI 710 is associated with a resource type 715, priority 720, packet delay budget 725, packet error loss rate 730, attention indicator 735, and example services 740. Previous descriptions of these parameters or examples may be similar to those given during the description of FIG. 6. In this example, the QCIs 710 are labeled with a value from one of two sets, either 1-9 or 1'-9'. In some embodiments, two values from each set with the same number may be considered clones of each other, with the exception of the attention indicator. For instance, the QCI #3' may be considered a clone of the QCI #3, as all QCI parameters listed for each are the same with the exception of the attention indicator 735. Similarly, for each of QCI #1 through QCI #9, there is another QCI labeled from 1'-9' that may be considered a clone. Although not limited as such, in the examples of FIGS. 6-7, the QCIs 710 labeled 1-9 have the same parameters (other than the attention indicators 635, 735) as the QCIs 610 labeled 1-9 in FIG. 6. It should also be noted that the concept of a QCI clone is not limiting and may serve as a representation of one or more QCIs that satisfy such qualities. In addition, the numbering technique described above is not limiting. As an example, two QCIs may qualify as clones of each other as described above, but may be labeled with two different numbers, such as "12" and "15."

In FIG. 8, 14 rows of the table 800 are each associated with a QCI 810, and each QCI 810 is associated with a resource type 815, priority 820, packet delay budget 825, packet error loss rate 830, attention indicator 835, and example services 840. Previous descriptions of these parameters or examples may be similar to those given during the description of FIGS. 6-7. In this example, the QCIs 810 are labeled with a value from one of two sets, either 1-9 or 1'-9'. In some embodiments, two values from each set with the same number may be considered clones of each other. For instance, the QCI #4' may be considered a clone of QCI #4, as all QCI parameters listed for each are the same with the exception of the attention indicator 835. In contrast to the QCIs 710 from the table 700, however, all of the QCIs 810 do not have a clone QCI 810 listed. For instance, the QCIs #1, #2, #3, and #7 do not have a clone QCI 810 for which all parameters other than the attention indicator 835 are the same. The attention indicators 835 for those cases take the value of "attended," and the table 800 does not include a clone for the "unattended" case. In some cases, it may make sense only to have an attended QCI or an unattended QCI, but not both. For instance, a conversational voice service that operates according to QCI #1 may only generate or use attended traffic due to the nature of the service (a person talking).

In the example of FIG. 8, the table 800 may be considered a subset of the table 700 in which some of the CQIs 710 are excluded. In some cases, a method that utilizes the table 800 may be considered a hybrid between methods that utilize the table 600 and methods that use the table 700.

As mentioned previously, the EPS bearer setup message may include a QCI for the PS service. The QCI for the PS service may be included in a predetermined group of candidate QCIs such as those included in a table such as 600, 700 or 800, and each candidate QCI may be associated with a QCI priority, QCI performance thresholds, and an attention indicator, but are not so limited and may be associated with other QCI parameters.

As an example, the group of candidate QCIs may include a first candidate QCI and second candidate QCI, and a first QCI priority for the first candidate QCI may be the same as a second QCI priority for the second candidate QCI. In those embodiments, first QCI performance thresholds for the first candidate QCI may be the same as second QCI performance thresholds for the second candidate QCI. In addition, attention indicators for the first candidate QCI and the second candidate QCI may be different in those embodiments. As an example, the first candidate QCI may be a clone of the second candidate QCI. It should be noted that the group of candidate QCIs may include more than just the first and second candidate QCIs. The QCIs 710 in the table 700, each of which has a clone, may be considered an example of one such embodiment.

As another example, the group of candidate QCIs may also include a third candidate QCI in addition to the first and second candidate QCIs just described and possibly other candidate QCIs. The third candidate QCI may be associated with a third QCI priority, third QCI performance thresholds, and a third attention indicator. Each candidate QCI in the group of candidate QCIs other than the third candidate QCI may be associated with a QCI priority that is different from the third QCI priority or may be associated with QCI performance thresholds that are different from the third QCI performance thresholds. Accordingly, the group of candidate QCIs may not have a clone QCI for the third candidate. The QCIs 810 in the table 800 may be considered an example of one such embodiment, as some of those QCIs 810 have a clone listed in the table 800 while some others do not.

Returning to the method 500, at operation 510, a traffic packet may be transmitted, according to the EPS bearer 130, to the UE 102 as part of the PS service. In addition, traffic packets may be exchanged in any direction between the UE 102, eNB 104, SGW 108, and PGW 110 according to the EPS bearer 130. As previously described, the EPS bearer 130 may be associated with an attention indicator and/or QCI that may determine or affect allocation of resources, prioritization, scheduling, traffic shaping, or other aspects of those and other transmissions.

At operation 515, a congestion level for the network may be determined. The congestion level may include or refer to shortfalls in performance measures of the network such as bandwidth or latency. The congestion level may be an amount, or predicted amount, of shortfall in those resources, or may be an indication that congestion is occurring, will occur or may occur. Congestion may occur at one or more links of the EPS bearer 130. As an example, the uplink or downlink radio bearer between the eNB 104 and the UE 102 may become congested. As another example, the S1 bearer 120 between the eNB 104 and the SGW 108 or the S5/S8 bearer 125 between the SGW 108 and the PGW 110 may become congested.

At operation 520, transmission of a traffic packet for the PS service may be delayed when the congestion level is above a congestion threshold. At operation 525, a second traffic packet for a second PS service may be transmitted when the congestion level is above the congestion threshold. The congestion threshold may be a predetermined or predicted value at which performance of the network may degrade. The congestion threshold is not limited to a single performance parameter or to a single point along the EPS bearer 130. For instance, the congestion threshold may take into account available bandwidth and latency experienced jointly. Such congestion thresholds may be determined through simulation, analysis or other techniques. It should also be noted that the transmission may be wireless or wired, which may depend on the components involved in the transmission.

As an example, as part of prioritization, a component such as the eNB 104 or other component may have to delay transmission of one or more packets from a first PS service in order to allow one or more higher priority packets from a second PS service (or others) to be transmitted on limited resources. It should be noted that embodiments are not limited to the number of packets and PS services described in this example. In some embodiments, the second PS service may be associated with the same UE 102, and may operate according to a second EPS bearer established between the UE 102 and the PGW 110. In some embodiments, the second PS service may be associated with a second, different UE served by the same eNB 104.

The attention parameter may also be used as part of prioritization or as part of congestion control. As an example, the traffic for a first PS service may be unattended and traffic for a second PS service may be attended. In response to a determination that a congestion level is above a congestion threshold, transmission of a first traffic packet for the first PS service may be delayed, but a second traffic packet for a second PS service may be transmitted. In some cases, this may occur despite the second PS service having a lower QCI priority than the first PS service. Accordingly, in some embodiments, the attention indicator may over-ride the CQI priority during congestion periods as part of a congestion control.

It should be noted that embodiments are not limited to the examples of two PS services with the QCI priorities and attention indicators described, and other cases may be taken into account and other strategies may be employed as part of prioritization and/or congestion control. For example, only a portion of the packets to be transmitted for a PS service that is unattended may be delayed as opposed to the entire group of packets. These examples are not intended to be exhaustive, but are intended to illustrate that the attention indicator included as part of the EPS bearer 130 or QCI may be used as a parameter for congestion control, in addition to or instead of other QCI parameters or other parameters.

Returning to the method 500, at operation 530, a second EPS bearer setup message for an establishment of a second EPS bearer 130 for a second PS service may be received at the eNB 104 from the MME 106. In some embodiments, a first QCI priority for the PS service may be the same as a second QCI priority for the second PS service, and first QCI performance thresholds for the PS service may be the same as second QCI performance thresholds for the second PS service. In addition, attention indicators for the PS service and the second PS service may be different. Accordingly, the PS service and second PS service may be clones of each other, as previously described. The eNB 104 may establish both PS services with the UE 102, and the UE 102 may alternate between the two in response to user attention or other behavior.

At operation 535, a resource indicator for the UE 102 that includes a congestion level for the network and an available throughput for the UE 102 for the PS service may be transmitted. In some embodiments, the resource indicator may be transmitted in response to a determination of a congestion condition for the network. As an example of the congestion condition, a congestion level may be greater than a congestion threshold, which may be related to throughput or other performance parameter. As another example, a backlog or queue of packets waiting for transmission may become large. As another example, some packets in the queue may have already incurred significant latency and may be at risk for exceeding a total latency if not transmitted with urgency.

In some embodiments, the resource indicator may include an available resource level (in terms of throughput or other parameter) for the UE 102. The resource indicator also may include a time period, such that the UE 102 may utilize the specified resources within that time period. In some embodiments, the resource indicator may include a congestion level or other code for the network that may be mapped to an available resource level according to a predetermined mapping. For instance, congestion levels of 0, 1, 2, and 3 may be mapped to "no congestion," 100, 10, and 1 Mbps, respectively. That is, a congestion level of 0 may be transmitted when the network is not experiencing congestion, and the UE 102 may operate in a "normal" mode. Congestion levels of 1, 2 or 3 may inform the UE 102 to limit its use of the available throughput according to the above examples or other values. Accordingly, the UE 102 may utilize the information for internal tasks that may include, but are not limited to, allocating resources (like throughput), blocking applications or providing internal prioritizations, which may be within the packets or applications. As an example, the operating system (OS) of the UE 102 or other centralized application or a new software layer may perform or be involved in such operations. As another example, the new software layer may be for 3GPP or other standards.

In some embodiments, the resource indicator may be a binary indicator, taking on values such as congested/not congested, yes/no or similar to indicate if the network is experiencing congestion or not. The resource indicator may be broadcast to the UE 102 and other UEs in some embodiments. The resource indicator may also be transmitted to the UE 102 in a dedicated control or other message in some embodiments.

At operation 540, a second radio bearer associated may be established as part of the EPS bearer 130. The EPS bearer 130 for the PS service may include a first radio bearer associated with a first attention indicator for the PS service. The second radio bearer may be associated with a second attention indicator different than the first attention indicator. Accordingly, the second radio bearer may be considered a mirror of the first radio bearer. In some embodiments, other bearers included in the EPS bearer 130 other than the radio bearers may remain associated with the first attention indicator. At operation 545, the eNB 104 may allocate, when a congestion condition for the network is determined, different available throughputs for the UE 102 for the first radio bearer and the second radio bearer. The allocations may be based at least partly on the first and second attention indicators. As an example, the first and second radio bearers may be associated with attended and unattended traffic, and the eNB 104 may allocate more throughput for the radio bearer associated with attended traffic. These embodiments are not limiting, as the allocation of different available resources for the UE 102 is not limited to occurring in response to the determination of the congestion condition.

Figure 9:
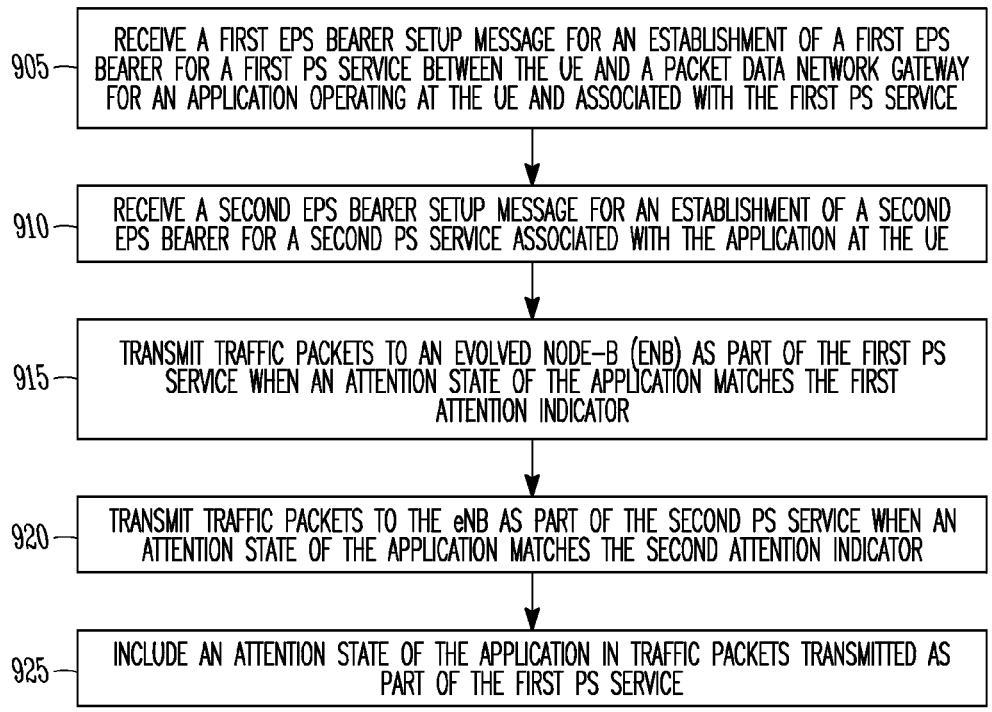
FIG. 9 illustrates the operation of another method of supporting packet-switched (PS) services in accordance with some embodiments.

Referring to FIG. 9, a method 900 of supporting PS services according to EPS bearers is shown. As mentioned previously regarding the method 500, embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-8 and 10, although it is understood that the method 900 may be practiced with any other suitable systems, interfaces and components. In addition, embodiments of the method 900 may refer to MMEs, eNBs 104, UEs 102, APs, STAs, other wireless devices, other mobile devices or other devices or components of wireless networks.

It should be noted that previous discussion, techniques, operations and concepts related to the method 500 may be applied to the method 900 in some cases. For instance, the attention indicator, QCI, QCI parameters, EPS bearers, PS services described as part of the method 500 may be similar to or the same as corresponding concepts used in the method 900.

At operation 905, a first EPS bearer setup message may be received at the UE 102 for an establishment of a first EPS bearer for a first PS service between the UE 102 and a Packet Data Network Gateway (PGW) 110. The first EPS bearer setup message may include a first attention indicator for the first PS service that indicates whether traffic for the first PS service is attended or unattended at the UE 102. The attention indicator may be for an application operating at the UE 102 as part of the first PS service, and may be similar or the same as attention indicators described previously.

At operation 910, a second EPS bearer setup message for an establishment of a second EPS bearer for a second PS service associated may be received at the UE 102. The second PS service may be associated with the same application at the UE 102 and may include a second attention indicator for the second PS service. In some embodiments, a first QCI priority for the first PS service may be the same as a second QCI service type for the second PS service. In those embodiments, first QCI performance thresholds for the first PS service may be the same as second QCI performance thresholds for the second PS service. In those embodiments, the first and second attention indicators may be different, in which case the first EPS bearer and second EPS bearer may be considered mirror bearers. In addition, the first QCI and second QCI may be clones of each other, except for the attention indicator parameter.

Such an arrangement may be beneficial in that the UE 102 may have both the first and second EPS bearers established, and traffic may be sent on the appropriate bearer of the two based on whether or not the traffic is attended or unattended (or determined to be attended or unattended). Accordingly, an attention state of the application may be determined using any suitable technique at the UE 102, including but not limited to techniques used in the operating system (OS), the hardware of the UE, a middle layer of software at the UE or an application operating at the UE. At operation 915, traffic packets may be transmitted to the eNB 104 as part of the first PS service when an attention state of the application matches the first attention indicator. At operation 920, traffic packets may be transmitted to the eNB 104 as part of the second PS service when an attention state of the application matches the second attention indicator. At operation 925, the attention state of the application may be included in traffic packets transmitted as part of the first PS service. In addition, the attention state of the application may also be included in traffic packets transmitted as part of the second PS service.

In some embodiments, the UE 102 may mark uplink packets transmitted to the eNB 104 as attended or unattended. The marking may be done in any suitable manner within headers of the packet or within a traffic portion of the packet. The PGW 110 may mark downlink packets as attended or unattended in response to the indication from the UE 102. In addition, any of the PGW 110, SGW 108 or eNB 104 may classify and/or mark the downlink packets as attended or unattended. The UE 102, which may be aware of whether or not a given application is currently attended, may select which bearer to use at any given time for the given application. The UE 102 can change the allocation from one bearer to another if the attention state changes. The network may receive the traffic in a given bearer of the two and can map the same type of traffic for the UE 102 in the downlink in the same type of bearer (attended versus unattended). The network can, for example, perform packet inspection and map all traffic going to a specific IP address in the uplink to traffic coming from the same IP address in the downlink (for a given UE 102). This mapping may be done in the PGW 110. Accordingly, the network can use this information to perform traffic classification in both UL and DL, to prioritize packets, to handle congestion situations or to perform other related operations.

In some embodiments, the EPS bearer may include first and second radio bearers for exchanging packets with the UE 102. The radio bearers may be mirror bearers with a first attention indicator for the first radio bearer different from a second attention indicator for the second radio bearer, while other QCI parameters previously described may be the same. The eNB 104 may inspect an uplink packet from the UE 102 to determine information such as an IP address and a port number for the PS service, which may be included in the uplink packet. For instance, the information may be included in one or more headers of the uplink packet. The attention indicator may also be included in the uplink packet, and may indicate which bearer (first or second) was used for transmission by the UE 102.

For downlink packets arriving at the eNB 104 for transmission to the UE 102 or other UEs, the eNB 104 may inspect the downlink packets to determine information such as an IP address and port number, which may be included in one or more headers of the downlink packets. For downlink packets that can be matched to the previously described uplink packet in terms of IP address and port number, the eNB 104 may transmit those packets on the same radio bearer (first or second) used for transmission of the uplink packet by the UE 102. Accordingly, transmission of those packets on the first or second radio bearer may include transmission that uses or is based on the attention indicator included in the uplink packet. For instance, a congestion control process or algorithm (including those described earlier) at the eNB 104 may use the attention indicator included in the uplink packet. In some embodiments, the attention indicator in the uplink packet may even over-ride another attention indicator associated with the EPS bearer.

Similar techniques may be used at the PGW 110. In some embodiments, the EPS bearer may include first and second radio bearers for exchanging packets with the UE 102, and a first attention indicator for the first radio bearer may be different from a second attention indicator for the second radio bearer. The PGW 110 may include hardware processing circuitry configured to receive an uplink packet on the EPS bearer and to determine an IP address and a port number for the PS service included in the uplink packet. The hardware processing circuitry may be further configured to, for a downlink packet, determine an IP address and a port number included in the downlink packet. The hardware processing circuitry may be further configured to, when the IP address and port number included in the uplink packet match the IP address and port number included in the downlink packet, transmit the downlink packet according to a congestion priority based at least partly on the first attention indicator.

An Evolved Node-B (eNB) to support packet-switched (PS) services in a network in accordance with Evolved Packet System (EPS) bearers is disclosed herein. The eNB may include hardware processing circuitry configured to receive, from a Mobility Management Entity (MME), an EPS bearer setup message for an establishment of an EPS bearer for a PS service between a User Equipment (UE) and a Packet Data Network Gateway (PGW). The hardware processing circuitry may be further to transmit, according to the EPS bearer, a traffic packet to a User Equipment (UE) as part of the PS service. In some embodiments, the EPS bearer setup message may include an attention indicator for the PS service that indicates whether traffic for the PS service is attended or unattended at the UE. In some embodiments, the PS service may be associated with an application operating at the UE, and when the traffic for the PS service is attended, the traffic may be at least partly generated by or used by the application during a time period of user interaction with the application at the UE. In some embodiments, the EPS bearer setup message may include a Quality of Service class indicator (QCI) for the PS service that may be associated with a QCI priority, QCI performance thresholds, and the attention indicator for the PS service.

In some embodiments, the QCI for the PS service may be included in a predetermined group of candidate QCIs, and each candidate QCI in the group of candidate QCIs may be associated with a QCI priority, QCI performance thresholds, and an attention indicator. In some embodiments, the group of candidate QCIs may include a first candidate QCI and second candidate QCI. A first QCI priority for the first candidate QCI may be the same as a second QCI priority for the second candidate QCI, first QCI performance thresholds for the first candidate QCI may be the same as second QCI performance thresholds for the second candidate QCI, and attention indicators for the first candidate QCI and the second candidate QCI may be different. In some embodiments, the group of candidate QCIs may include a third candidate QCI associated with a third QCI priority, third QCI performance thresholds, and a third attention indicator. Each candidate QCI other than the third candidate QCI may be associated with a QCI priority that is different from the third QCI priority or may be associated with QCI performance thresholds that are different from the third QCI performance thresholds.

The hardware processing circuitry may be further configured to, when the traffic for the PS service is unattended, delay transmission of a traffic packet for the PS service in response to a determination that the congestion level for the network is above a congestion threshold. In some embodiments, the transmission of the traffic packet may include transmission of the traffic packet to the UE, the EPS bearer may include a radio bearer for exchanging of traffic packets between the eNB and the UE, and the congestion level may be associated with the radio bearer. In some embodiments, the transmission of the traffic packet may include transmission of the traffic packet to the PGW, the EPS bearer may include one or more network bearers for exchanging of traffic packets between the eNB and the PGW, and the congestion level may be associated with at least one of the network bearers.

The hardware processing circuitry may be further configured to transmit a second traffic packet for a second PS service when the congestion level is above the congestion threshold and traffic for the second PS service is attended. In some embodiments, a QCI priority for the PS service may be not less than a QCI priority for the second PS service. In some embodiments, the second PS service may be for a second, different UE. The hardware processing circuitry may be further configured to receive, from the MME, a second EPS bearer setup message for an establishment of a second EPS bearer for a second PS service associated with the application at the UE. In some embodiments, a first QCI priority for the PS service may be the same as a second QCI priority for the second PS service, first QCI performance thresholds for the PS service may be the same as second QCI performance thresholds for the second PS service, and attention indicators for the PS service and the second PS service may be different.

The hardware processing circuitry may be further configured to transmit, in response to a determination of a congestion condition for the network, a resource indicator for the UE that includes a congestion level for the network, an available throughput for the UE for the PS service or an indicator of available resources for the UE during a time period. In some embodiments, the EPS bearer for the PS service may include a first radio bearer associated with a first attention indicator for the PS service. The hardware processing circuitry may be further configured to establish, as part of the EPS bearer, a second radio bearer associated with a second attention indicator different than the first attention indicator. The hardware processing circuitry may be further configured to allocate, when a congestion condition for the network is determined, different available throughputs for the UE for the first radio bearer and the second radio bearer, wherein the allocations are based at least partly on the first and second attention indicators.

In some embodiments, the EPS bearer may include first and second radio bearers for exchanging packets with the UE, and a first attention indicator for the first radio bearer may be different from a second attention indicator for the second radio bearer. The hardware processing circuitry may be further configured to receive an uplink packet on the first radio bearer and to determine an IP address and a port number for the PS service included in the uplink packet. The hardware processing circuitry may be further configured to, for a downlink packet, determine an IP address and a port number included in the downlink packet. The hardware processing circuitry may be further configured to, when the IP address and port number included in the uplink packet match the IP address and port number included in the downlink packet, transmit the downlink packet according to a congestion priority based at least partly on the first attention indicator.

A non-transitory computer-readable storage medium that stores instructions for execution by one or more processors to perform operations for support of packet-switched (PS) services in a network in accordance with Evolved Packet System (EPS) bearers is also disclosed herein. The operations may configure the one or more processors to receive, from a Mobility Management Entity (MME), an EPS bearer setup message for an establishment of an EPS bearer for a PS service between a User Equipment (UE) and a Packet Data Network Gateway (PGW) and transmit, according to the EPS bearer, a traffic packet to a User Equipment (UE) as part of the PS service. In some embodiments, the EPS bearer setup message may include an attention indicator for the PS service that indicates whether traffic for the PS service is attended or unattended at the UE. In some embodiments, the PS service may be associated with an application operating at the UE, and when the traffic for the PS service is attended, the traffic may be at least partly generated by or used by the application during a time period of user interaction with the application at the UE. In some embodiments, the EPS bearer setup message may include a Quality of Service class indicator (QCI) for the PS service that is associated with a QCI priority, QCI performance thresholds, and the attention indicator for the PS service.

A method of supporting packet-switched (PS) services in a network in accordance with Evolved Packet System (EPS) bearers is also disclosed herein. The method may include receiving, from a Mobility Management Entity (MME), an EPS bearer setup message for an establishment of an EPS bearer for a PS service between a User Equipment (UE) and a Packet Data Network Gateway (PGW) and transmitting, according to the EPS bearer, a traffic packet to a User Equipment (UE) as part of the PS service. In some embodiments, the EPS bearer setup message may include an attention indicator for the PS service that indicates whether traffic for the PS service is attended or unattended at the UE. In some embodiments, the PS service may be associated with an application operating at the UE, and when the traffic for the PS service is attended, the traffic may be at least partly generated by or used by the application during a time period of user interaction with the application at the UE. In some embodiments, the EPS bearer setup message may include a Quality of Service class indicator (QCI) for the PS service that may be associated with a QCI priority, QCI performance thresholds, and the attention indicator for the PS service.

A Mobility Management Entity (MME) to establish packet-switched (PS) services in a network in accordance with Evolved Packet System (EPS) bearers is also disclosed herein. The MME may include hardware processing circuitry configured to transmit an EPS bearer setup message to an Evolved Node-B (eNB) for an establishment of an EPS bearer for a PS service between a User Equipment (UE) and a Packet Data Network Gateway (PGW) that are communicatively coupled to the eNB. In some embodiments, the EPS bearer setup message may include an attention indicator for the PS service that indicates whether traffic for the PS service is attended or unattended at the UE. In some embodiments, the PS service may be associated with an application operating at the UE, and when the traffic for the PS service is attended, the traffic may be at least partly generated by or used by the application during a time period of user interaction with the application at the UE. In some embodiments, the attention indicator may be for congestion control at the eNB.

In some embodiments, the EPS bearer setup message may include a Quality of Service class indicator (QCI) for the PS service that is associated with a QCI priority, QCI performance thresholds, and the attention indicator for the PS service. In some embodiments, the QCI for the PS service may be included in a predetermined group of candidate QCIs, and each candidate QCI in the group of candidate QCIs may be associated with a QCI priority, QCI performance thresholds, and an attention indicator. In some embodiments, the group of candidate QCIs may include a first candidate QCI and second candidate QCI. A first QCI priority for the first candidate QCI may be the same as a second QCI priority for the second candidate QCI. First QCI performance thresholds for the first candidate QCI may be the same as second QCI performance thresholds for the second candidate QCI and attention indicators for the first candidate QCI and the second candidate QCI may be different. In some embodiments, the group of candidate QCIs may include a third candidate QCI associated with a third QCI priority, third QCI performance thresholds, and a third attention indicator. Each candidate QCI other than the third candidate QCI may be associated with a QCI priority that is different from the third QCI priority or may be associated with QCI performance thresholds that are different from the third QCI performance thresholds.

A User Equipment (UE) to communicate in packet-switched (PS) services in a network in accordance with Evolved Packet System (EPS) bearers is also disclosed herein. The UE may include hardware processing circuitry configured to receive a first EPS bearer setup message for an establishment of a first EPS bearer for a first PS service between the UE and a Packet Data Network Gateway (PGW). In some embodiments, the first EPS bearer setup message may include a first attention indicator for an application operating at the UE as part of the first PS service, the attention indicator providing an indication whether traffic for the first PS service is attended or unattended at the UE. The hardware processing circuitry may be further configured to receive a second EPS bearer setup message for an establishment of a second EPS bearer for a second PS service associated with the application at the UE. In some embodiments, the second EPS bearer setup message may include a second attention indicator for the second PS service. A first QCI priority for the first PS service may be the same as a second QCI service type for the second PS service and first QCI performance thresholds for the first PS service may be the same as second QCI performance thresholds for the second PS service. The first and second attention indicators may be different.

In some embodiments, the first PS service and second PS service may be associated with an application operating at the UE and the hardware processing circuitry may be further configured to transmit traffic packets to an Evolved Node-B (eNB) as part of the first PS service when an attention state of the application matches the first attention indicator and transmit traffic packets to the eNB as part of the second PS service when the attention state of the application matches the second attention indicator. The hardware processing circuitry may be further configured to include an attention state of the application in traffic packets transmitted as part of the first PS service.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An Evolved Node-B (eNB) to support packet-switched (PS) services in a network in accordance with Evolved Packet System (EPS) bearers, the eNB comprising hardware processing circuitry configured to:

receive, from a Mobility Management Entity (MME), an EPS bearer setup message for an establishment of an EPS bearer for a PS service between a User Equipment (UE) and a Packet Data Network Gateway (PGW), the EPS bearer setup message comprising an initial context setup request;

transmit, according to the EPS bearer, a traffic packet to the UE as part of the PS service; and transmit, in response to a determination of a congestion condition for the network, a resource indicator for the UE that includes a congestion level for the network, an available throughput for the UE for the PS service or an indicator of available resources for the UE during a time period for use of the available resources, wherein the EPS bearer setup message includes an attention indicator for the PS service that indicates whether traffic for the PS service is attended or unattended at the UE.

2. The eNB according to claim 1, wherein the PS service is associated with an application operating at the UE, and when the traffic for the PS service is attended, the traffic is at least partly generated by or used by the application during a time period of user interaction with the application at the UE.

3. The eNB according to claim 2, wherein:

the hardware processing circuitry is further configured to receive, from the MME, a second EPS bearer setup message for an establishment of a second EPS bearer for a second PS service associated with the application at the UE;

a first QCI priority for the PS service is the same as a second QCI priority for the second PS service;

first QCI performance thresholds for the PS service are the same as second QCI performance thresholds for the second PS service; and attention indicators for the PS service and the second PS service are different.

4. The eNB according to claim 1, wherein:

the EPS bearer setup message includes a Quality of Service class indicator (QCI) for the PS service;

the QCI for the PS service is included in a predetermined group of candidate QCIs; and each candidate QCI in the group of candidate QCIs is associated with a QCI priority, QCI performance thresholds, and an attention indicator.

5. The eNB according to claim 4, wherein:

the group of candidate QCIs includes a first candidate QCI and second candidate QCI;

a first QCI priority for the first candidate QCI is the same as a second QCI priority for the second candidate QCI;

first QCI performance thresholds for the first candidate QCI are the same as second QCI performance thresholds for the second candidate QCI; and attention indicators for the first candidate QCI and the second candidate QCI are different.

6. The eNB according to claim 5, wherein:

the group of candidate QCIs includes a third candidate QCI associated with a third QCI priority, third QCI performance thresholds, and a third attention indicator; and each candidate QCI other than the third candidate QCI is associated with a QCI priority that is different from the third QCI priority or is associated with QCI performance thresholds that are different from the third QCI performance thresholds.

7. The eNB according to claim 1, the hardware processing circuitry further configured to, when the traffic for the PS service is unattended, delay transmission of a traffic packet for the PS service in response to a determination that a congestion level for the network is above a congestion threshold.

8. The eNB according to claim 7, wherein:
the transmission of the traffic packet includes transmission of the traffic packet to the UE;
the EPS bearer includes a radio bearer for exchanging of traffic packets between the eNB and the UE; and
the congestion level is associated with the radio bearer.

9. The eNB according to claim 7, wherein:
the transmission of the traffic packet includes transmission of the traffic packet to the PGW;
the EPS bearer includes one or more network bearers for exchanging of traffic packets between the eNB and the PGW; and
the congestion level is associated with at least one of the network bearers.

10. The eNB according to claim 7, the hardware processing circuitry further configured to transmit a second traffic packet for a second PS service when the congestion level is above the congestion threshold and traffic for the second PS service is attended.

11. The eNB according to claim 10, wherein a QCI priority for the PS service is not less than a QCI priority for the second PS service.

12. An Evolved Node-B (eNB) eNB to support packet-switched (PS) services in a network in accordance with Evolved Packet System (EPS) bearers, the eNB comprising hardware processing circuitry configured to:
receive, from a Mobility Management Entity (MMF), an EPS bearer setup message for an establishment of an EPS bearer for a PS service between a User Equipment (UE) and a Packet Data Network Gateway (PGW);
transmit, according to the EPS bearer, a traffic packet to the UE as part of the PS service; wherein the EPS bearer setup message includes an attention indicator for the PS service that indicates whether traffic for the PS service is attended or unattended at the UE, the EPS bearer includes first and second radio bearers for exchanging packets with the UE, wherein a first attention indicator for the first radio bearer is different from a second attention indicator for the second radio bearer;
receive an uplink packet on the first radio bearer;
determine an IP address and a port number for the PS service included in the uplink packet;
for a downlink packet, determine an IP address and a port number included in the downlink packet; and
when the IP address and port number included in the uplink packet match the IP address and port number included in the downlink packet, transmit the downlink packet according to a congestion priority based at least partly on the first attention indicator.

13. An Evolved Node-B (eNB) eNB to support packet-switched (PS) services in a network in accordance with Evolved Packet System (EPS) bearers, the eNB comprising hardware processing circuitry configured to:
receive, from a Mobility Management Entity (MME), an EPS bearer setup message for an establishment of an EPS bearer for a PS service between a User Equipment (UE) and a Packet Data Network Gateway (PGW);
transmit, according to the EPS bearer, a traffic packet to the UE as part of the PS service;
wherein the EPS bearer setup message includes an attention indicator for the PS service that indicates whether traffic for the PS service is attended or unattended at the UE, the EPS bearer for the PS service includes a first radio bearer associated with a first attention indicator for the PS service; and
establish, as part of the EPS bearer, a second radio bearer associated with a second attention indicator different than the first attention indicator; and
when a congestion condition for the network is determined, allocate different available throughputs for the UE for the first radio bearer and the second radio bearer, wherein the allocations are based at least partly on the first and second attention indicators.

14. A non-transitory computer-readable storage medium that stores instructions for execution by one or more processors to perform operations for support of packet-switched (PS) services in a network in accordance with Evolved Packet System (EPS) bearers, the operations to configure the one or more processors to:
receive, from a Mobility Management Entity (MME), an EPS bearer setup message for an establishment of an EPS bearer for a PS service between a User Equipment (UE) and a Packet Data Network Gateway (PGW);
transmit, according to the EPS bearer, a traffic packet to a User Equipment (UE) as part of the PS service; and
transmit, in response to a determination of a congestion condition for the network, a resource indicator for the UE that includes a congestion level for the network, an available throughput for the UE for the PS service or an indicator of available resources for the UE during a time period, wherein the EPS bearer setup message includes an attention indicator for the PS service that indicates whether traffic for the PS service is attended or unattended at the UE,
wherein the EPS bearer setup message includes:
a Quality of Service class indicator (QCI) for the PS service that is associated with a QCI priority, QCI performance thresholds, and
the attention indicator for the PS service, and
wherein the attention indicator overrides the COI priority during congestion periods.

15. The non-transitory computer-readable storage medium according to claim 14, wherein the PS service is associated with an application operating at the UE, and when the traffic for the PS service is attended, the traffic is at least partly generated by or used by the application during a time period of user interaction with the application at the UE.

16. The non-transitory computer-readable storage medium according to claim 14, wherein the operations to configure the one or more processors to establish multiple EPS bearers for traffic from a same application of the UE, the EPS bearers established for PS services that have a same QCI priority and a same QCI performance threshold and different attention indicators and are simultaneously active, a particular one of the EPS bearers used for the application dependent on whether the application is attended or unattended.

17. A method of supporting packet-switched (PS) services in a network in accordance with Evolved Packet System (EPS) bearers, comprising:
receiving, from a Mobility Management Entity (MME), an EPS bearer setup message for an establishment of an EPS bearer for a PS service between a User Equipment (UE) and a Packet Data Network Gateway (PGW);
transmitting, according to the EPS bearer, a traffic packet to a User Equipment (UE) as part of the PS service;
wherein the EPS bearer setup message includes an attention indicator for the PS service that indicates whether traffic for the PS service is attended or unattended at the UE, the EPS bearer includes first and second radio bearers in which a first attention indicator for the first radio bearer is different from a second attention indicator for the second radio bearer, and at least one of:
receiving an uplink packet on the first radio bearer;
determine an IP address and a port number for the PS service included in the uplink packet;
for a downlink packet, determining an IP address and a port number included in the downlink packet; and
when the IP address and port number included in the uplink packet match the IP address and port number included in the downlink packet, transmitting the downlink packet according to a congestion priority based at least partly on the first attention indicator, or
when a congestion condition for the network is determined, allocating different available throughputs for the UE for the first radio bearer and the second radio bearer in which the allocations are based at least partly on the first and second attention indicators.

18. The method according to claim 17, wherein the PS service is associated with an application operating at the UE, and when the traffic for the PS service is attended, the traffic is at least partly generated by or used by the application during a time period of user interaction with the application at the UE.

19. A Mobility Management Entity (MME) to establish packet-switched (PS) services in a network in accordance with Evolved Packet System (EPS) bearers, the MME comprising hardware processing circuitry configured to:
transmit an EPS bearer setup message to an Evolved Node-B (eNB) for an establishment of an EPS bearer for a PS service between a User Equipment (UE) and a Packet Data Network Gateway (PGW) that are communicatively coupled to the eNB, wherein the EPS bearer setup message includes an attention indicator for the PS service that indicates whether traffic for the PS service is attended or unattended at the UE, the EPS bearer includes first and second radio bearers in which a first attention indicator for the first radio bearer is different from a second attention indicator for the second radio bearer, and at least one of:
when an IP address and port number included in an uplink packet for the PS service match an IP address and port number included in a downlink packet, the downlink packet is transmitted according to a congestion priority based at least partly on the first attention indicator, or
when a congestion condition for the network is determined, different available throughputs are allocated for the UE for the first radio bearer and the second radio bearer in which the allocations are based at least partly on the first and second attention indicators.

20. The MME according to claim 19, wherein the PS service is associated with an application operating at the TIE, and when the traffic for the PS service is attended, the traffic is at least partly generated by or used by the application during a time period of user interaction with the application at the UE.

21. The MME according to claim 19, wherein the attention indicator is further for congestion control at the eNB.

22. The MMF according to claim 19, wherein the EPS bearer setup message includes a Quality of Service class indicator (QCI) for the PS service that is associated with a QCI priority, QCI performance thresholds, and the attention indicator for the PS service.

23. The MME according to claim 22, wherein:
the QCI for the PS service is included in a predetermined group of candidate QCIs;
each candidate QCI in the group of candidate QCIs is associated with a QCI priority, QCI performance thresholds, and an attention indicator.

24. The MME according to claim 23, wherein:
the group of candidate QCIs includes a first candidate QCI and second candidate QCI;
a first QCI priority for the first candidate QCI is the same as a second QCI priority for the second candidate QCI;
first QCI performance thresholds for the first candidate QCI are the same as second QCI performance thresholds for the second candidate QCI; and
attention indicators for the first candidate QCI and the second candidate QCI are different.

25. The MME according to claim 24, wherein:
the group of candidate QCIs includes a third candidate QCI associated with a third QCI priority, third QCI performance thresholds, and a third attention indicator;
each candidate QCI other than the third candidate QCI is associated with a QCI priority that is different from the third QCI priority or is associated with QCI performance thresholds that are different from the third QCI performance thresholds.

26. User Equipment (UE) to communicate in packet-switched (PS) services in a network in accordance with Evolved Packet System (EPS) bearers, the UE comprising hardware processing circuitry configured to:
receive a first EPS bearer setup message for an establishment of a first EPS bearer for a first PS service between the UE and a Packet Data Network Gateway (PGW);
receive a second EPS bearer setup message for an establishment of a second EPS bearer for a second PS service associated with the application at the UE;
wherein the first EPS bearer setup message includes a first attention indicator for an application operating at the UE as part of the first PS service, the attention indicator providing an indication whether traffic for the first PS service is attended or unattended at the UE, the second EPS bearer setup message includes a second attention indicator for the second PS service;
a first Quality of Service class indicator (QCI) priority for the first PS service is the same as a second QCI service type for the second PS service;
first QCI performance thresholds for the first PS service are the same as second QCI performance thresholds for the second PS service; and
the first and second attention indicators are different.

27. The UE according to claim 26, wherein:
the first PS service and second PS service are associated with an application operating at the UE; and
the hardware processing circuitry is further configured to:
transmit traffic packets to an Evolved Node-B (eNB) as part of the first PS service when an attention state of the application matches the first attention indicator; and
transmit traffic packets to the eNB as part of the second PS service when the attention state of the application matches the second attention indicator.

28. The UE according to claim 26, the hardware processing circuitry further configured to include an attention state of the application in traffic packets transmitted as part of the first PS service.

* * * * *

UNITED STATES PATENT AND TRADEMARK OFFICE
CERTIFICATE OF CORRECTION

PATENT NO.        : 9,787,595 B2
APPLICATION NO.   : 14/532751
DATED             : October 10, 2017
INVENTOR(S)       : Yiu et al.

Page 1 of 1

It is certified that error appears in the above-identified patent and that said Letters Patent is hereby corrected as shown below:

In the Claims

In Column 19, Line 31, in Claim 12, delete "(MMF)," and insert --(MME),-- therefor In Column 20, Line 38, in Claim 14, delete "COI" and insert --CQI-- therefor In Column 21, Line 57, in Claim 20, delete "TIE," and insert --UE,-- therefor In Column 21, Line 63, in Claim 22, delete "MMF" and insert --MME-- therefor Signed and Sealed this
Twenty-eighth Day of May, 2019

Andrei Iancu
*Director of the United States Patent and Trademark Office*